Dec. 22, 1970    N. R. PETERSON    3,549,389
FOOD PACKAGE
Original Filed July 1, 1965
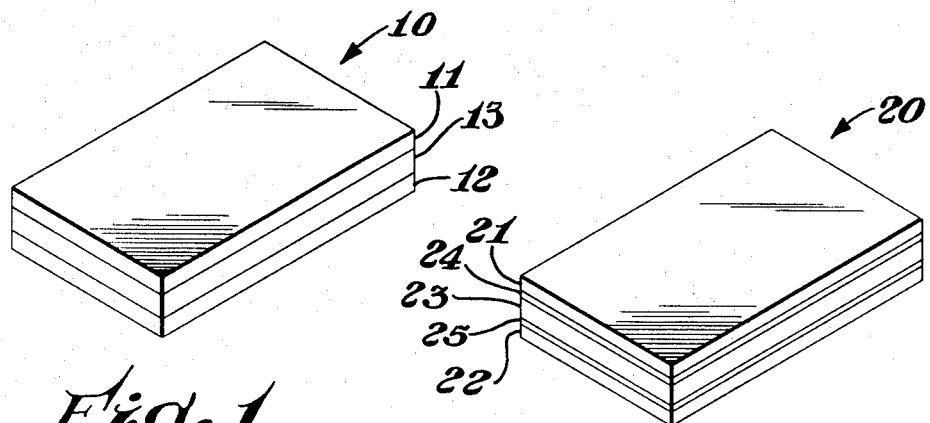
Fig. 1
Fig. 2
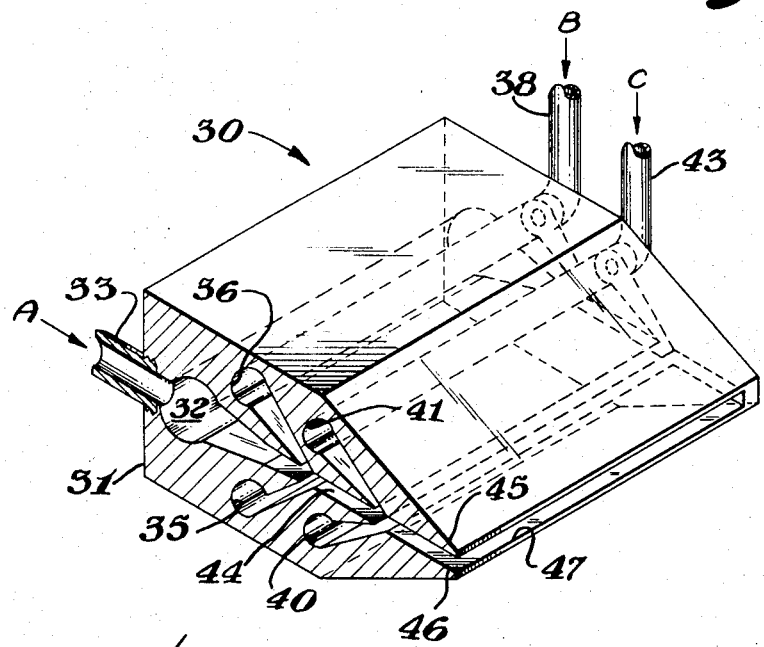
Fig. 3
INVENTOR.
Norman R. Peterson
BY
Robert B. Ingraham
AGENT

United States Patent Office 3,549,389
Patented Dec. 22, 1970

3,549,389
FOOD PACKAGE
Norman R. Peterson, Midland, Mich., assignor to The Dow Chemical Company, Midland, Mich., a corporation of Delaware
Original application July 1, 1965, Ser. No. 468,886. Divided and this application Sept. 17, 1969, Ser. No. 870,960
Int. Cl. B65b 25/06
U.S. Cl. 99—174                3 Claims

ABSTRACT OF THE DISCLOSURE

Layered barrier packaging films are disclosed which employ polyolefin outer layers and gas barrier inner layers. The films thermoform well and are eminently suited for food packaging and the like.

---

This application is a divisional application of my copending application Ser. No. 468,886, filed July 1, 1965.

This invention relates to an improved packaging film and more particularly relates to a composite multi-layer packaging film.

The application of synthetic, resinous, flexible, thermoplastic films in the packaging art has become widespread. However, for many packaging applications, the known synthetic resinous films are not entirely satisfactory. It is possible to prepare packaging films having a wide variety of characteristics and any single desirable characteristic which is possessed by a synthetic, resinous, thermoplastic composition is usually readily attained. However, to obtain a useful packaging film, it must have many and varied properties. For desirable commercial application, such as in the area of the packaging of cheese and processed meats, much more is required from a packaging film than the mere fact that it is transparent and sealable by one means or the other. For an optimum film which provides product protection and desirable processability, it must be a reasonable barrier to the passage of oxygen, carbon dioxide, and moisture vapor. Oxygen passing through a packaging film of cheese or processed meat frequently results in spoilage. Similarly, the undesired loss of carbon dioxide can cause unfavorable alteration in color in the keeping properties of a packaged meat or cheese. The film should be relatively resistant to the passage of moisture vapor, otherwise the cheese or meat product will dry and become unsightly.

Oftentimes in the packaging of processed meat and cheese for consumer consumption, the packages are prepared under not too carefully controlled conditions and oftentimes such packaging is done at the retail outlet where control of the sealing of the package to an optimum degree is not easily achieved. Therefore, a desirable packaging film for processed meat and cheese must be heat sealable and heat sealable over a relatively wide range of temperatures without causing unsightly deformation of the resultant package.

Oftentimes sliced processed meats are packaged between two preformed portions of film which are vacuum or pressure formed to a contour closely approximating that of the final desired article to be packaged. For example, oftentimes a rectangular meat loaf is sliced into a plurality of slices and is packaged in portions of one-half or one pound and, in order to provide an attractive package, at least one portion of the film is pressure formed or is vacuum formed in a mold to form a rectangular container closely conforming to the configuration of the quantity of meat. Many films having desirable packaging characteristics do not pressure form over a wide range of temperatures and indeed some form poorly even in an optimum narrow range of temperatures. It is essential and critical in the formation of such a package that the film draw or form in such a manner that all portions of the package have a relatively uniform thickness. For example, it is not unusual in forming a 2 mil thick film into a shallow rectangular container 4 inches by 4 inches and an inch and a half deep to discover that the thickness of the formed container in the corners where three sides meet is somewhere in the range of a quarter to one-half mil.

Oftentimes a film having poor thermoforming characteristics will rupture and not provide a useful product. In order to provide a satisfactory packaging film, it is necessary that such thermoforming is accomplished in a relatively simple and economical manner. Further, a desirable packaging film must be relatively abrasion resistant. It must not scar or scratch when abraded by like or different materials under conditions of food handling and transportation. Abrasion of the film in the resultant package is highly undesirable as it frequently results in failure of the package by rupture or by causing the package to become unsightly and therefore not attractive to the purchaser. A film which is suitable for the wrapping of processed meat products and cheese most desirably should be a limp film, that is, a film that readily conforms to the shape of the product being packaged and is not stiff or noisy. Such a limp film might well be termed as a soft film as distinguished from hard films, such as polystyrene and the like. Often, processed meats and cheeses are packaged in such a manner that the plane surface of the film does not readily conform to the configuration of the package, that is, the article to be packaged does not have cubic or rectangular configuration. Thus, a sheet of film must wrinkle and be resistant to failure under such wrinkling, that is, the film must be crumple resistant. It must maintain its barrier properties after being crumpled or wrinkled in order to provide a successful and useful package. The ideal packaging film for cheese and processed meats ideally has a low shrink energy, that is, on being heated to its thermoplastic temperature, it has relatively low shrink energy. The low tendency to shrink is of great benefit when thermoforming, as the clamping pressures are low, and high precision clamps requiring a great deal of maintenance are not needed in the thermoforming apparatus. It is particularly essential and critical for a packaging film to have a high gloss and clarity. If the film does not have a high gloss and is not clear, the resultant package is unattractive to the buyer and the film is therefore unsatisfactory. Printability is an extremely desirable characteristic to have in a packaging film for processed meat and cheese wherein various indicia may be readily printed upon the surface thereof by conventional processes. Another characteristic which is very desirable in a packaging film for cheese and processed meats is that of having a relatively high strength at the sealing temperature. For example, a film of a polymer which has a sharp crystalline melting point is undesirable in many applications as heating the film to a temperature sufficiently high to result in heat sealing of the film to itself or to another material requires extremely close control of sealing temperatures and of manipulation of the package during the sealing operation. For example, polyvinylidene chloride copolymers containing major portions of polymerized vinylidene chloride are usually extremely difficult to heat seal as the temperature must be closely controlled and such films at the heat sealing temperature become quite fluid and exhibit little or no strength. A film having high strength at heat sealing temperatures is extremely desirable as the sealing conditions may be varied to a much greater extent and yet result in an acceptable package. For example, with a film of low heat seal strength, sealing may be accomplished under ideal conditions but premature removal of the package by the operator may result in unsightly deformation of the film and result in loss of the package and the necessity of repackaging the contents. Thus, it is highly desirable at heat sealing temperatures that the film exhibit relatively high mechanical strength. Individually, such characteristics are easily obtainable with known packaging films. However, the combination of these characteristics into a single packaging film is not known.

The present invention provides a packaging film having the foregoing unique combination of beneficial and advantageous properties and these features and advantages are obtained in a flexible packaging film comprising at least one inner or central layer having first and second major surfaces and first and second outer layers adhered to the major surfaces of the central layer, the central layer being generally an unoriented barrier material, the surface layers comprising a generally unoriented polyolefin.

By the term "polyolefin" is meant polyethylene, polypropylene resinous copolymers of ethylene and propylene, copolymers of ethylene and/or propylene with minor proportions of olefinically unsaturated monomers such as, for example, those alpha-olefins having from 2 to 8 carbon atoms such as 1-butene, 1-pentene, 1-hexene, 1-heptene, 1-octene and mixed higher alphaolefins. Other hydrocarbons useful for making copolymers with ethylene and propylene include divinylbenzene, allene, dimethallyl, and isopentene. Comonomers which can broadly be used include mono-substituted ethylenes such as 1-pentene, vinylcyclohexene, allyl benzene, $C_8$-$C_{14}$ mixed alpha-olefins, styrene, allyl naphthalene, and the like, 1,1-disubstituted ethylenes such as alphamethyl styrene, 2-methylbutene-1, mixed alpha- and beta-pinenes, camphene and the like, 1,2-disubstituted ethylenes such as indene, acenaphthylene, cyclopentene, norbornylene, cyclohexane, trans-stilbene, 2-pentene and the like, conjugated dienes and trienes such as pentadiene-1,3, 1,2-dihydrobenzene, allo-ocimene, and cyclopentadiene, unconjugated dienes such as mixed octadienes, hexadiene-1,5, 2,5-dimethylhexadiene - 1,5, 1,4 - dihydrobenzene, bicycloheptadiene, bicyclopentadiene, 4-vinylcyclohexene-1, and 4,7-diphenyl decadiene-1,9, acetylenes such as isopropenyl acetylene and phenyl acetylene, chloroolefins such as beta-methallyl chloride and chloromethyl norbornylene, and m-chlorostyrene, ethers and epoxides, esters such as vinyl butyrate, vinyl acetate, and methyl acrylate, and nitrogen compounds such as vinyl carbazole, 4-vinyl pyridine and acrylonitrile, and mixtures and blends thereof.

Products in accordance with the present invention are readily prepared by heat-plastifying a core-forming barrier polymer as hereinbefore described, heat-plastifying a polyolefin material, such as employed in the outer layers, while in the heat-plastified condition, deforming the heat-plastified polymers to form a layer of polyolefin resin disposed generally about the barrier polymer while the polymers are restrained within a configuration, deforming the heat-plastified materials into a stream, deforming the stream into a film-like configuration, passing the resultant composite heat-plastified stream into a cooling zone and lowering the temperature of the stream below the heat-plastifying temperature thereof.

A wide variety of barrier materials may be employed in the central layer of films in accordance with the present invention. Particularly suited as barrier layers are combinations of vinylidene-chloride polymers, vinyl-chloride polymers, vinylidene-fluoride polymers and extrudable mixtures thereof. The requirement for the central layer is that the material be extrudable within a sheath of another polymer and that the composition have the desired gas and moisture vapor transmission barrier characteristics. Particularly advantageous and beneficial are extrudable compositions of vinylidene-chloride polymers, wherein the polymers contain at least about 70 weight percent vinylidene-chloride, the remainder being one or more olefinically unsaturated monomers copolymerizable therewith. Suitable vinylidene-chloride copolymers are prepared utilizing such comonomers as methyl, ethyl, isobutyl, butyl, octyl and 2-ethylhexyl acrylates and methacrylate; phenyl methacrylate, cyclohexyl methacrylate, p-cyclohexylphenyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide or monoalkyl substition products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride and allyl glycidyl ether. Commercially available light stabilizers may also be incorporated in the vinylidene chloride material such as tertiary-butyl salol. Other barrier compositions which may be used with benefit in films in accordance with the present invention are vinyl chloride polymers which contain a predominant amount of vinyl chloride therein, and beneficially, fluorocarbon polymers, fluorohydrocarbon polymers and fluorohalohydrocarbon polymers may also be used with benefit. Such materials as polyvinyl chloride, polyvinylidene fluoride, chlorinated polyethylene and polymers of such materials as vinylidene fluoride, vinylidene fluoride and chlorotrifluoroethylene, chlorotrifluoroethylene and vinylidene fluoride, chlorotrifluoroethylene and vinyl chloride, chlorotrifluoroethylene-vinylidene fluoride and tetrafluoroethylene and the like. Generally, for economic reasons, the vinylidene chloride polymers are employed, as they are most readily available at relatively low cost.

Beneficially, in the extrusion of the vinylidene polymers, it is frequently advantageous and beneficial to incorporate therein a minor portion of a plasticizer, oftentimes a heat stabilizer and a light stabilizer. Such additives are well known in the art and generally are found advantageous in that the temperature required for the extrusion is substantially reduced and the probability of decomposition of the polymer in the extruder is lowered. Typical plasticizers which are employed in the vinylidene or saran combinations are acetyl tributyl citrate, epoxidized soyabean oil (commercially available under the trade designation of Paraplex G–60) and dibutyl sebacate.

Further features and advantages of the present invention will become more apparent from the following specification when taken in connection with the drawing wherein:

FIG. 1 is an exaggerated isometric view of a packaging film in accordance with the invention.

FIG. 2 is an exaggerated isometric view of an alternate embodiment of the invention.

FIG. 3 is a schematic representation of an apparatus for the preparation of the packaging film of FIGS. 1 and 2 in accordance with the present invention.

In FIG. 1, there is illustrated a flexible packaging film generally designated by the reference numeral 10. The package 10 comprises a first outer polyolefin layer 11, a second outer polyolefin layer 12 and a centrally disposed barrier layer 13 consisting of a halocarbon or a halohydrocarbon. The layers 11, 12 and 13 are securely attached to each other.

In FIG. 2 is illustrated a view of a packaging film generally designated by the reference numeral 20. The film 20 comprises a first outer layer 21, a second outer layer 22 of a polyolefin material, a third layer 23 of an oxygen and moisture vapor barrier and bonding layers 24 and 25. The bonding layers 24 and 25 are of an adhesive material which secures the layer 21 to the layer 23 and the layer 22 to the layer 23, respectively.

FIG. 3 is a sectional view of an apparatus generally designated by the reference numeral 30, particularly adapted to prepare products such as the film 10 of FIG. 1 and film 20 of FIG. 2. The apparatus 30 comprises in cooperative combination a die or facing body 31 having defined therein a first elongated passageway 32. The passageway 32 is in operative communication with a source of heat-plastified thermoplastic material 33. The direction of flow is indicated by the arrow and the material identified by the letter A. The die 31 also defines internal cavities 35 and 36 which are generally commensurate in width with the passageway 32. The cavities 35 and 36 are in communication with a heat-plastified polymer source 38 which is so constructed and arranged so as to provide heat-plastified thermoplastic material to the cavities 35 and 36. The flow material is indicated by the arrow and the type of material is identified by the letter B. The die 31 defines fourth and fifth internal passageways 40 and 41 which extend within the die body 31 and are generally coextensive in width with the passageway 32. The passageways 40, 41 are in operative communication with a third source 43 of a heat-plastified polyolefin material. The direction of flow is indicated by the arrow and the material by the letter C. The passageways 32, 40 and 41 and the cavities 35 and 36 connect with a common passage 44 extending for the width generally commensurate with the passageway 32. The common passageway 44 terminates remote from cavity at the die lips 45 and 46 which define an extrusion slot 47.

In the preparation of packaging film in accordance with the present invention, a wide variety of extrusion arrangements may be employed. However, for simplicity, preparation of such films shall be described of the extrusion die illustrated in FIG. 3. Employing the arrangement of FIG. 3, one layer, two layer, three, four and five layer films are readily produced which may be either symmetrical or unsymmetrical wherein the barrier layer is of single or multiple layer construction. If a thermoplastic resinous material is suplied from the source of thermoplastic resinous material 33, 38 or 43, a single layer film will issue from the extrusion orifice 47. Thermoplastic material is suplied from the sources A and B or A and C or B and C. A three-layer film will result which will have the arrangement of polymer BAB, CAC, or CBC. Alternately, a five-layer film is prepared when thermoplastic resinous material is supplied from all three sources. The resultant film has the arrangement of CBABC. If the source B is connected only to the cavity 35 and not to the cavity 36, the combination which results is CABC. When only the passageway 40 is connected to the source C, the resultant product has the combination of BABC. Beneficially the proportions or thickness of the various layers are readily controlled within extremely wide limits by the rate of feed from the various polymer sources. Thus, the thickness of any of the layers may be varied from essentially a maximum to almost a monomolecular layer by appropriate feed control. Advantageously, in producing a five-layered film, the barrier material is introduced from the polymer source A and the hydrocarbon or halogenated hydrocarbon material introduced from the source C. Beneficially, for certain instances it is critical to increase the peel strength of the resultant laminate and beneficially the polymer from the source B is an adhesion-promoting material which adheres strongly to the material A and the material C. Barrier films in accordance with the present invention beneficially employ a centrally disposed barrier layer of a high melting material of low permeability such as saran materials which contain at least 80 percent vinylidene chloride copolymerized therein and beneficially 85 percent and even 90 weight percent. Such saran resins are of a high crystalline variety and exhibit excellent barrier properties. In the extrusion of saran-type resins, it is necessary to use corrosion-resistant material until they are separated from the processing equipment by a layer of diverse resinous material exhibiting lower or lessor corrosive properties. Other barrier materials which ae eminently satisfactory are hydrocarbons containing fluoride and chlorine such as polytetrafluoroethylene, polychlorotrifluoroethylene and copolymers containing major portions of the hydrocarbons containing fluorine and chlorine. Polyvinylchloride, polyesters and nylon resins are also satisfactory in many instances as barrier layers. However, for optimum barrier characteristics, saran and fluorocarbons and fluorochlorocarbons are generally unsurpassed. The interior or central layer of the barrier films shall be such that the oxygen transmission of the total film will be not more than 10 cubic centimeters per hundred square inches for 24 hours per atmosphere at 70° Fahrenheit.

Beneficially, in certain instances, it is desirable to add adhesives or bonding layers between the barrier layer and the outer polyolefin layer. The nature of such bonding or adhesive layers must be such that the adhesion between the outer and inner layer is increased as increased seal strength and resistance to delamination are to be obtained.

A variety of polymers may be employed for the purpose and coextruded simultaneously as the film is formed to provide five-layer films, wherein the outer layers are of a polyolefin layer, such as polyethylene, polypropylene and the resinous copolymers of ethylene and propylene.

Beneficially, the adhesive layer will vary in thickness from about 0.05 to about 0.8 mil; however, generally the preferred range of adhesive layer thickness is from about 0.1 to about 0.3 mil in thickness. Oftentimes the strength of the bond between the inner or core layer and the outer or surface layer increases slowly as the thickness of the adhesive layer is increased, and generally little or no increase in the bond strengths occurs after the thickness of the bonding layer has reached 0.5 to 0.6.

A wide variety of polymers and polymeric compositions are useful to increase the adhesion between the polyolefin outer layer and the inner barrier layer. Suitable polymers or polymeric compositions are readily selected by determining the bonding strength of the composition being evaluated by forming a two-layer extrusion as is attained when employing the die of FIG. 3, wherein polymer A is provided and polymer B is provided to either of the cavities 36 or 35. The bond strength of the resultant two-layer laminate is readily determined by conventional peel strength tests. Similarly, the adhesive layer composition is evaluated by a similar extrusion utilizing the polyolefin material.

Of great help in selecting the proper adhesive layer material are the solubility parameters or $\delta$ values. Solubility parameters or $\delta$ values are discussed in "Some Factors Affecting the Solubility of Polymers" by P. A. Small, Journal of Applied Chemistry, 3, 71 (1953) and also in "Solubility Parameters" by Harry Burrell in the Interchemical Review 14, 3–16, 31–46 (1955). For example, some $\delta$ values of typical polymers are polytetrafluoroethylene 6.2; polypropylene 7.2; polyethylene 7.9; butadiene/styrene 8.1; polystyrene 9.1; polyethyl acrylate 9.2; chlorinated polyethylene (35 weight percent chlorine) 9.3; polyvinylacetate 9.4; polyvinyl chloride 9.7; 76 percent styrene and 24 per cent acrylonitrile 10.1; chlorostyrene 10.5; 85 percent vinylidene chloride and 15 percent vinyl chloride 12.2; and polyacrylonitrile 15.4. Generally, adhesion is obtained when a polymer is selected having $\delta$ values which are within about 3 units each of the materials to be adhered. For example, polyethylene and the vinylidene chloride polymer are readily adhered by copolymers having $\delta$ values between 9.2 and about 10.1. In the instance of adhering layers of polyolefins such as polyethylene and polypropylene to vinylidene chloride polymers, polymers which are particularly advantageous are copolymers from about 13 weight percent to about 35 weight percent vinyl acetate with from about 87 weight percent to about 65 weight percent ethylene, copolymers of from about 20 to 30 weight percent ethylacrylate with from about 80 to 70 weight percent ethylene, copolymers from about 20 to 30 weight percent isobutyl acrylate with from about 80 to 70 weight percent of ethylene, chlorinated polyethylene containing from about 25 to 40 weight percent chlorine and polyvinyl chloride.

Beneficial and advantageous thermoplastic resinous films in accordance with the present invention are employed having thicknesses from about one-half to about 20 mils. However, the barrier layer shall have a thickness of from about $5 \times 10^{-5}$ to $4 \times 10^{-4}$ inches, and the layers shall be combined in the absence of air as within an extrusion die. Beneficially, in many instances, particularly when employing saran compositions, a substantial and significant increase of the barrier properties is achieved by heat treating the composite film for a period at elevated temperatures. Beneficially, such treatment is carried out at a temperature of from about 120° Fahrenheit to about 200° Fahrenheit. Typically, a treating time of 5 minutes at 180° Fahrenheit is very satisfactory, as the temperature is increased shorter times are required, whereas at lower temperatures longer treatment periods are desirable.

In the preparation of film of the present invention, it is possible to employ as a central or internal barrier layer materials which are not readily extruded or shaped into commercially acceptable thin films due to decomposition or undesirable extrusion characteristics. The provision of the outer layer of polyolefin material essentially obviates the requirement for close temperature control of the central or inner layer or layers and conditions may vary widely from that generally considered optimum for the type of resin employed. Indeed, it is possible to extrude saran resins into smooth transparent composite films which can not be extruded into such films without the presence of the outer layer. Thus, exceptionally high barrier characteristics can be obtained in a film which is smooth and transparent, such barrier properties are unavailable in films of equivalent thickness and densities.

Generally, pure polyvinylidene chloride can not be conveniently handled by conventional extrusion techniques. Polyvinylidene chloride decomposes very rapidly at temperatures which might be expected to permit extrusion thereof. Pure polyvinylidene chloride generally has a molecular weight sufficiently high that, for practical purposes, it is considered infusible, insoluble, and useless for the preparation of thermoplastic resinous articles. However, with the addition of minor portions of other monomers, a useful thermoplastic extrudable polymer is obtained. The characteristics of such polymers, particularly those which contain about 85 weight percent of vinylidene chloride copolymerized therein, change rapidly as the weight percentage of vinylidene chloride increases and approaches 100 percent. In order to obtain maximum barrier characteristics both to oxygen and to moisture vapor, it is desirable to include within the copolymer as high a weight percentage of vinylidene chloride as is possible with due regard to the tendency of such materials to decompose under heat forming or extrusion conditions. Thus, the use of vinylidene chloride polymers in extrusion or similar heat fabrication operations has been severely limited by the heat stability thereof. In order to permit processing of vinylidene chloride polymers containing relatively high proportions of vinylidene chloride, it has been necessary to use only copolymers, and these copolymers generally must contain at least a plasticizer and a heat stabilizer. Oftentimes such stabilizers and plasticizers comprise two or more components. Generally, in order to provide an extrudable vinylidene chloride composition, the nature of the additives which are used is such that they are relatively incompatible with the resin system, that is, the heat-fabricated resin or the resin during the heat fabrication has a tendency to reject or cause these materials to separate. So, in general, the level of additives to a vinylidene chloride copolymer is maintained below the level of about 10 percent.

Beneficially, the amount of stabilizing additives added to the halohydrocarbon material, such as the vinylidene chloride composition, can be substantially and significantly reduced below normal levels in the method of the present invention.

Beneficially, in the embodiments of the invention which utilize an adhesive layer to bond the polyolefin to the halohydrocarbon light stabilizers which are conventionally utilized in vinylidene chloride compositions are omitted and a suitable ultraviolet light absorbing stabilizer incorporated in the adhesive composition to provide a sufficient screening of the vinylidene chloride or halohydrocarbon layer from ultraviolet light, while avoiding the necessity of incorporating significantly larger amounts of the stabilizer into the central or barrier layers.

Much difficulty is encountered in the extrusion and forming of such compositions as the stabilizers and plasticizers and various additives tend to separate from the resin frequently at the die face where minute quantities tend to accumulate together with minor portions of material such as the resin itself and a buildup of solid material occurs which oftentimes will tend to plug or deform the extrusion opening. Such an undesirable situation results in frequent shutdowns to clean the apparatus and in many cases prevents desirably long production runs without shutdown. This phenomenon of a buildup at the die face under relatively ideal conditions often results in down time of an extruder ranging from 15 minutes to an hour in every 8 hours of operation as well as considerable waste material. In the extrusion of high vinylidene chloride copolymers, it generally is impractical to stop extrusion of the material during cleaning or minor servicing of the extruder, as the polymer material must be extruded at a temperature that is sufficiently high to cause rapid degradation if the polymer is allowed to remain in the heated zone of the extruder for a period much greater than the minimal time required to heat plastify the composition and extrude into the desired form. The matter of decomposition is one of degree. During a heat-forming operation, decomposition of the polymer is continuous and, if extruded rapidly and at optimum temperatures, a commercially acceptable product is obtained which shows no apparent decomposition. However, as the residence time of the material in the extruder increases, black carbon specks and gas voids become apparent and at excessive residence time the rate of decomposition can become so great that the extruder explodes. The decomposition products of vinylidene chloride materials generally include hydrogen chloride, which is combination with a small amount of moisture which is in the feed stock and oftentimes is impractical to eliminate, results in relatively corrosive conditions existing within the extruder. Therefore, rather elegant materials such as nickel must be used in the zone of the extruder where the polymer is in a heat-plastified condition. The extruder barrel, the worm or screw and dies must be extremely resistant to the corrosion. The present invention requires only the necessity of making a relatively small portion of the extrusion equipment corrosion resistant. The screw and the barrel of the polyolefin extruder may be prepared from conventional corrosive susceptible steel and like construction material. By encapsulating a flowing stream within a polyolefin layer, the corrosive effect of the vinylidene chloride polymer is eliminated and the dies employed can be of conventional steel or other desirable materials rather than nickel alloys and the like. Beneficially, the coextrusion technique of the present invention permits the use of vinylidene chloride products having much higher barrier properties than those utilized to make film or sheet from a vinylidene chloride polymer alone. The conditions of extrusion required for the material of the outer layer are essentially those which are usable with the material of the outer layer alone. Thus, for example, in preparing a composite film in accordance with the invention, the extrusion conditions for the material of the outer layer are those which are optimum for that outer layer. The temperature conditions required for the inner layer can vary over relatively wide limits and, in effect, excellent uniform film is obtained when the central layer is extruded at temperatures which would result in rough, opaque and deformed film if only material of the central layer were being extruded. Beneficially, extrudable compositions of vinylidene chloride when sandwiched between two or more layers of a diverse polymer will respond favorably to heat treating to increase the resistance to oxygen and moisture vapor transmission. Therefore, in accordance with the present invention, vinylidene chloride polymers having especially low oxygen and moisture vapor transmissions can be handled by extruding and the oxygen and moisture vapor barrier characteristics can be further improved by heating the resultant compositions at elevated temperatures. The length of heating time decreases sharply as the temperature is increased. Thus, films having a relatively low density and high barrier characteristics are readily prepared using a minimum quantity of vinylidene chloride copolymer.

Preparation of film in accordance with the present invention has relatively high oxygen, carbon dioxide and moisture vapor barrier characteristics because of the halohydrocarbon core. The halohydrocarbon resin compositions used in the present invention have a higher melting point or heat seal temperature than do the polyolefin copolymers suitable for the surface layer. Because of these characteristics, a wide range of temperatures may be employed to heat seal the materials because of the support of the vinylidene chloride barrier layer. Although the sealing temperatures are above the optimum temperature for the sealing of a polyolefin film, the halohydrocarbon material at these temperatures still provides adequate mechanical support for the relatively fluid polyolefin layers on the surface. The polyolefin surface layer provides excellent abrasion resistance, gloss, clarity and printability. By employing a generally unoriented or non-biaxially oriented film, excellent draw characteristics are obtained as the shrink energy of the films in accordance with the present invention is exceptionally low.

By way of further illustration, a plurality of multi-layer films were extruded having the dimensions, compositions and characteristics set forth in the following tables.

TABLE 1.—EXTRUSION DATA ON 3 AND 5 LAYER FILMS

| Sample No. | Layer composition | Thickness, mils | Plastic temp., °C. | Die temp., °C. | Lbs./rate, hr. | Chill roll temp., °C. |
|---|---|---|---|---|---|---|
| 1 | PE (D) | 0.90 | 190 | 220 | 127 | 18 |
|   | Saran (A) | 0.20 | 155 | | | |
|   | PE (D) | 0.90 | | | | |
| 2 | PE (D) | 1.80 | 189 | 220 | 127 | 18 |
|   | Saran (A) | 0.40 | 155 | | | |
|   | PE (D) | 1.80 | | | | |
| 3 | PE (B) | 1.85 | 208 | 220 | 143 | 90 |
|   | Saran (A) | 0.30 | 150 | | | |
|   | PE (B) | 1.85 | | | | |
| 4 | PE (B) | 0.80 | 195 | 215 | 140 | 90 |
|   | Saran (A) | 0.40 | 150 | | | |
|   | PE (B) | 0.80 | | | | |
| 5 | PE (B) | 0.40 | 195 | 215 | 140 | 90 |
|   | Saran (A) | 0.20 | 250 | | | |
|   | PE (B) | 0.40 | | | | |
| 6 | PE (B) | 0.28 | 195 | 215 | 140 | 90 |
|   | Saran (A) | 0.14 | 150 | | | |
|   | PE (B) | 0.28 | | | | |
| 7 | PE (B) | 0.50 | 193 | 210 | 110 | 72 |
|   | PEVAc (C) | 0.10 | 170 | | | |
|   | Saran (A) | 0.35 | 180 | | | |
|   | PEVAc (C) | 0.10 | | | | |
|   | PE (B) | 0.50 | | | | |
| 8 | PE (B) | 1.70 | 190 | 215 | 174 | 80 |
|   | PEVAc (C) | 0.10 | 190 | | | |
|   | Saran (A) | 0.42 | 140 | | | |
|   | PEVAc (C) | 0.10 | | | | |
|   | PE (B) | 1.70 | | | | |
| 9 | PE (B) | 1.00 | 190 | 230 | 170 | 85 |
|   | PEVAc (C) | 0.10 | 200 | | | |
|   | Saran (A) | 0.75 | 153 | | | |
|   | PEVAc (C) | 0.10 | | | | |
|   | PE (B) | 1.00 | | | | |
| 10 | PE (B) | 1.65 | 190 | 225 | 160 | 85 |
|   | PEVAc (C) | 0.10 | 195 | | | |
|   | Saran (A) | 0.50 | 144 | | | |
|   | PEVAc (C) | 0.10 | | | | |
|   | PE (B) | 1.65 | | | | |
| 11 | PE (B) | 1.75 | 185 | 225 | 174 | 90 |
|   | PEVAc (C) | 0.15 | 200 | | | |
|   | Saran (A) | 0.25 | 140 | | | |
|   | PEVAc (C) | 0.15 | | | | |
|   | PE (B) | 1.75 | | | | |
| 12 | PE (B) | 0.65 | 190 | 225 | 160 | 87 |
|   | PEVAc (C) | 0.10 | 200 | | | |
|   | Saran (A) | 0.50 | 145 | | | |
|   | PEVAc (C) | 0.10 | | | | |
|   | PE (B) | 0.65 | | | | |
| 13 | PE (B) | 0.72 | 185 | 225 | 160 | 90 |
|   | PEVAc (C) | 0.10 | 200 | | | |
|   | Saran (A) | 0.25 | 140 | | | |
|   | PEVAc (C) | 0.10 | | | | |
|   | PE (B) | 0.72 | | | | |
| 14 | PE (B) | 0.89 | | | 360 | 90 |
|   | Saran (F) | 0.27 | | | | |
|   | PE (B) | 0.89 | | | | |
| 15 | PE (B) | 0.75 | | | 355 | 110 |
|   | Saran (A) | 0.76 | | | | |
|   | PE (B) | 0.75 | | | | |

See notes at end of Table 3.

TABLE 1—Continued

| Sample No. | Layer composition | Thickness, mils | Plastic temp., °C. | Die temp., °C. | Lbs./rate, hr. | Chill roll temp., °C |
|---|---|---|---|---|---|---|
| 16 | PE (B) | 0.75 | | 355 | | 160 |
|  | Saran (A) | 0.72 | | | | |
|  | PE (B) | 0.76 | | | | |
| 17 | PE (B) | 0.79 | | 350 | | 165 |
|  | Saran (A) | 0.52 | | | | |
|  | PE (B) | 0.79 | | | | |
| 18 | PE (B) | 0.78 | | 355 | | 110 |
|  | Saran (G) | 0.36 | | | | |
|  | PE (B) | 0.79 | | | | |
| 19 | PE (B) | 1.09 | | | | |
|  | PEVAc (C) | 0.10 | | | | |
|  | Saran (A) | 0.61 | | 325 | | 60 |
|  | PEVAc (C) | 0.10 | | | | |
|  | PE (B) | 1.10 | | | | |
| 20 | PE (B) | 0.60 | | | | |
|  | PEVAc (C) | 0.10 | | | | |
|  | Saran (A) | 0.40 | | | | |
|  | PEVAc (C) | 0.10 | | | | |
|  | PE (B) | 0.60 | | | | |
| 21 | PE (B) | 1.14 | | | | 180 |
|  | PEVAc (C) | 0.10 | | | | |
|  | Saran (E) | 0.52 | 325 | 300 | | |
|  | PEVAc (C) | 0.10 | | | | |
|  | PE (B) | 1.15 | | | | |
| 22 | PE (B) | 1.17 | | | | |
|  | PEVAc (C) | 0.10 | | | | |
|  | Saran (H) | 0.46 | | | | |
|  | PEVAc (C) | 0.10 | | | | |
|  | PE (B) | 1.17 | | | | |
| 23 | PE (B) | 0.67 | | 355 | | 110 |
|  | Saran (I) | 0.54 | | | | |
|  | PE (B) | 0.66 | | | | |
| 24 | PE (D) | 0.86 | | 255 | | 85.98 |
|  | Saran (J) | 0.34 | | | | |
|  | PE (D) | 0.85 | | | | |
| 25 | PE (B) | 0.80 | | 350 | | 110 |
|  | Saran (K) | 0.10 | | | | |
|  | PE (B) | 0.80 | | | | |
| 26 | PE (B) | 0.78 | | 350 | | 160 |
|  | Saran (K) | 0.57 | | | | |
|  | PE (B) | 0.79 | | | | |
| 27 | PE (B) | 0.84 | | 360 | | 160 |
|  | Saran | 0.32 | | | | |
|  | PE (B) | 0.85 | | | | |
| 28 | PE (B) | 0.78 | | 350 | | 110 |
|  | Saran (L) | 0.36 | | | | |
|  | PE (B) | 0.79 | | | | |
| 29 | PE (B) | 1.19 | | 350 | | 160 |
|  | Saran (M) | 0.62 | | | | |
|  | PE (B) | 1.19 | | | | |
| 30 | PE (B) | 1.06 | | 315 | | 180 |
|  | PEVAc (C) | 0.10 | | | | |
|  | Saran (A) | 0.80 | | | | |
|  | PEVAc (C) | 0.10 | | | | |
|  | PE (B) | 1.06 | | | | |
| 31 | PE (B) | 1.53 | | 300 | | 180 |
|  | PEVAc (C) | 0.10 | | | | |
|  | Saran (N) | 0.20 | | | | |
|  | PEVAc (C) | 0.10 | | | | |
|  | PE (B) | 1.53 | | | | |
| 32 | PE (B) | 1.18 | | 300 | | 180 |
|  | PEVAc (C) | 0.10 | | | | |
|  | Saran (N) | 0.40 | | | | |
|  | PEVAc (C) | 0.10 | | | | |
|  | PE (B) | 1.19 | | | | |
| 33 | PE (B) | 1.08 | | 300 | | 180 |
|  | PEVAc (C) | 0.10 | | | | |
|  | Saran (N) | 0.60 | | | | |
|  | PEVAc (C) | 0.10 | | | | |
|  | PE (B) | 1.09 | | | | |
| 34 | PE (B) | 0.95 | | 300 | | 180 |
|  | PEVAc (C) | 0.10 | | | | |
|  | Saran (N) | 0.80 | | | | |
|  | PEVAc (C) | 0.10 | | | | |
|  | PE (B) | 0.95 | | | | |
| 35 | PP (O) | 1.85 | 232 | | | |
|  | Saran (A) | 0.60 | 180 | | | |
|  | PP (O) | 1.85 | | 193 | | 290 |
| 36 | PE (P) | 0.75 | 223 | 176 | | 32 |
|  | Saran (A) | 0.50 | 215 | | | |
|  | PE (P) | 0.75 | | | | |
| 37 | PE (P) | 0.8 | 223 | 176 | | 32 |
|  | Saran (A) | 0.4 | 215 | | | |
|  | PE (P) | 0.8 | | | | |
| 38 | PE (P) | 0.6 | 223 | 187 | | 32 |
|  | Saran (Q) | 0.8 | 230 | | | |
|  | PE (P) | 0.6 | | | | |

See notes at end of Table 3.

TABLE 1—Continued

| Sample No. | Layer composition | Thickness, mils | Plastic temp., °C. | Die temp., °C. | Lbs./rate, hr. | Chill roll temp., °C. |
|---|---|---|---|---|---|---|
| 39 | PE (P) | 0.8 | 223 | 187 | | 32 |
| | Saran (Q) | 0.4 | 230 | | | |
| | PE (P) | 0.8 | | | | |
| 40 | PP (C) | 1.2 | 223 | 234 | | 37 |
| | PEVAc (C) | 0.1 | 170 | | | |
| | PVC (R) | 1.4 | 245 | | | |
| | PEVAc (C) | 0.1 | | | | |
| | PP (O) | 1.2 | | | | |

See notes at end of Table 3.

TABLE 2.—PHYSICAL PROPERTIES OF SAMPLES OF TABLE 1

| Sample No. | Percent haze | Gardner, 20° | Gloss, 45° | Modulus C,[1] p.s.i. | Modulus L,[2] p.s.i. | Tensile C,[1] p.s.i. | Tensile L,[2] p.s.i. | Elongation C,[1] percent | Elongation L,[2] percent | Heat seal strength, g./in. | Range, °F. | $O_2$ permeability, cc./atm. | Dart drop, ft. lbs. 0° F. | Dart drop, ft. lbs. 72° F. | Layer to layer adhesion, g./in. |
|---|---|---|---|---|---|---|---|---|---|---|---|---|---|---|---|
| 9 | 5.63 | 94.5 | 81.4 | 38,100 | 34,300 | 2,230 | 2,650 | | 237 | 1,232 | | | | | |
| 10 | | | | 32,500 | 31,900 | 2,110 | 2,540 | 263 | 233 | 1,360 | | | | | |
| 11 | 5.40 | 80.7 | 77.0 | 32,900 | 28,700 | 1,675 | 2,270 | 328 | 310 | 1,680 | | | | | |
| 12 | 4.34 | 88.3 | 79.8 | 36,300 | 32,500 | 2,370 | 2,850 | 335 | 307 | 1,700 | | | | | |
| 13 | 3.99 | 95.4 | 81.8 | 32,700 | 29,100 | 2,030 | 2,440 | 317 | 237 | 1,715 | | | | | |
| 19 | 3.6 | | 86.1 | 38,000 | 33,000 | 1,800 | 1,790 | 360 | 361 | 1,680 | 60 | 1.57 | 0.047 | 0.48 | 493 |
| 20 | 2.8 | 115 | 82.5 | 33,000 | 35,000 | 1,960 | 1,900 | 345 | 321 | 1,520 | 55 | 1.7 | 0.033 | 0.38 | 381 |
| 21 | 4.4 | 110 | 82 | 44,000 | 40,000 | 2,100 | 2,040 | 427 | 380 | 2,240 | 70 | 0.95 | 0.064 | 0.55 | 573 |
| 22 | | | | 41,000 | 37,000 | 2,300 | 3,090 | 388 | 350 | 2,320 | 60 | 0.79 | 0.107 | 0.59 | 580 |
| 14 | | | | | | | | | | | | 3.33 | | | |
| 15 | | | | | | | | | | | | 2.80 | | | |
| 16 | | | | | | | | | | | | 1.29 | | | |
| 17 | | | | | | | | | | | | 3.49 | | | |
| 18 | | | | | | | | | | | | 8.12 | | | |
| 23 | | | | | | | | | | | | 58.4 | | | |
| 24 | | | | | | | | | | | | 3.96 | | | |
| 25 | | | | | | | | | | | | 12.74 | | | |
| 26 | | | | | | | | | | | | 3.08 | | | |
| 27 | | | | | | | | | | | | 3.63 | | | |
| 28 | | | | | | | | | | | | 1.85 | | | |
| 29 | | | | | | | | | | | | 1.20 | | | |
| 30 | | | | | | | | | | | | 1.10 | | | |
| 31 | | | | | | | | | | | | 1.16 | 0.089 | 0.56 | |
| 32 | | | | | | | | | | | | 0.95 | 0.064 | 0.55 | |
| 33 | | | | | | | | | | | | 0.82 | 0.078 | 0.60 | |
| 34 | | | | | | | | | | | | 0.62 | 0.090 | 0.60 | |

[1] C=Crosswise to direction of extrusion.
[2] L=Lengthwise to direction of extrusion.

TABLE 3.—LAYER TO LAYER ADHESION

| Sample No. | Layer composition | Thickness, mils | Layer to layer adhesion, g./in. | Peak seal strength, g./in. |
|---|---|---|---|---|
| 41 | PE (B) | 1.28 | 418 | 1,517 |
| | PEVAc (C) | 0.025 | | |
| | Saran (A) | 0.40 | | |
| | PEVAc (C) | 0.025 | | |
| | PE (B) | 1.28 | | |
| 42 | PE (B) | 1.25 | 508 | 1,737 |
| | PEVAc (C) | 0.05 | | |
| | Saran (A) | 0.40 | | |
| | PEVAc (C) | 0.05 | | |
| | PE (B) | 1.25 | | |
| 43 | PE (B) | 1.25 | 555 | 1,952 |
| | PEVAc (C) | 0.10 | | |
| | Saran (A) | 0.40 | | |
| | PEVAc (C) | 0.10 | | |
| | PE (B) | 1.25 | | |
| 44 | PE (B) | 1.20 | 688 | 2,243 |
| | PEVAc (C) | 0.20 | | |
| | Saran (A) | 0.40 | | |
| | PEVAc (C) | 0.20 | | |
| | PE (B) | 1.20 | | |
| 45 | PE (B) | 1.0 | | 2,075 |
| | PEVAc (C) | 0.30 | | |
| | Saran (A) | 0.40 | | |
| | PEVAc (C) | 0.30 | | |
| | PE (B) | 1.0 | | |
| 46 | PE (B) | 0.90 | | 1,934 |
| | PEVAc (C) | 0.40 | | |
| | Saran (A) | 0.40 | | |
| | PEVAc (C) | 0.40 | | |
| | PE (B) | 0.90 | | |
| 47 | PE (B) | 0.80 | | 1,853 |
| | PEVAc (C) | 0.50 | | |
| | Saran (A) | 0.40 | | |
| | PEVAc (C) | 0.50 | | |
| | PE (B) | 0.80 | | |
| 48 | PE (B) | 1.20 | 548 | 1,778 |
| | PEVAc (S) | 1.00 | | |
| | Saran (A) | 0.40 | | |
| | PEVAc (S) | 0.10 | | |
| | PE (B) | 1.20 | | |
| 49 | PE (B) | 1.20 | 463 | 1,562 |
| | PEVAc (T) | 0.10 | | |
| | Saran (A) | 0.40 | | |
| | PEVAc (T) | 0.10 | | |
| | PE (B) | 1.20 | | |
| 50 | PE (B) | 1.20 | 791 | 1,739 |
| | PEVAc (U) | 0.10 | | |
| | Saran (A) | 0.40 | | |
| | PEVAc (U) | 0.10 | | |
| | PE (B) | 1.20 | | |
| 51 | PE (B) | 0.60 | 710 | |
| | PEVAc (C) | 0.28 | | |
| | Saran (A) | 0.44 | | |
| | PEVAc (C) | 0.28 | | |
| | PE (B) | 0.60 | | |
| 52 | PE (B) | 0.60 | 876 | |
| | PEVAc (V) | 0.28 | | |
| | Saran (A) | 0.44 | | |
| | PEVAc (V) | 0.28 | | |
| | PE (B) | 0.60 | | |
| 53 | PE (B) | 0.60 | 870 | |
| | PEVAc (W) | 0.28 | | |
| | Saran (A) | 0.44 | | |
| | PEVAc (W) | 0.28 | | |
| | PE (B) | 0.60 | | |

See notes at end of table.

TABLE 3—Continued

| Sample No. | Layer composition | Thickness, mils | Layer to layer adhesion, g./in. | Peak seal strength, g./in. |
|---|---|---|---|---|
| 54 | PE (B) | 0.60 | 720 | |
|  | PEVAc (X) | 0.28 | | |
|  | Saran (A) | 0.44 | | |
|  | PEVAc (X) | 0.28 | | |
|  | PE (B) | 0.60 | | |
| 55 | PE (B) | 0.60 | 665 | |
|  | CPE (Y) | 0.28 | | |
|  | Saran (A) | 0.44 | | |
|  | CPE (Y) | 0.28 | | |
|  | PE (B) | 0.60 | | |
| 56 | PE (B) | 0.60 | 833 | |
|  | PEVAc (Aa) | 0.28 | | |
|  | Saran (A) | 0.44 | | |
|  | PEVAc (Aa) | 0.28 | | |
|  | PE (B) | 0.60 | | |
| 57 | PE (B) | 0.60 | 552 | |
|  | PEIBa (Ab) | 0.28 | | |
|  | Saran (A) | 0.44 | | |
|  | PEIBa (Ab) | 0.28 | | |
|  | PE (B) | 0.60 | | |

NOTES:

(A) 93.75 parts by weight of a copolymer of 85 weight percent vinylidene chloride and 15 weight percent vinyl chloride; 4.50 parts by weight acetyltributyl citrate, 1.00 part by weight of an epoxidized soyabean oil commercially available under the trade designation of Paraplex G-60, and 0.75 part by weight of 4-tertiarybutyl salol.
(B) Polyethylene, density 0.930, Melt Index 3.8.
(C) Copolymer of 72 weight percent ethylene and 28 weight percent vinyl acetate, Melt Index 3.0.
(D) Polyethylene, density .926, Melt Index 20.
(E) (A) plus 2.25 parts by weight of acetyltributyl citrate.
(F) 94 parts by weight of a copolymer of 90 weight percent vinylidene chloride and 10 weight percent vinylchloride, 5 weight percent dibutyl sebacate, and 1 weight percent of epoxidized soyabean oil commercially available under the trade designation Paraplex G-60.
(G) 47.5 parts by weight of a copolymer of 85 percent by weight of vinylidene chloride and 15 parts by weight vinyl chloride; 47.5 parts by weight of a copolymer of 73 weight percent of vinylidene chloride and 27 weight percent of vinyl chloride; 9 parts by weight dibutyl sebacate; ½ part by weight of a finely divided magnesium oxide; and 5 parts by weight of titanium dioxide.
(H) A copolymer of 85 weight percent vinylidene chloride and 15 weight percent vinyl chloride plasticized with 3 parts by weight per hundred parts by weight of copolymer of an epoxidized soyabean oil commercially available under the trade designation of Paraplex G-60.
(I) A copolymer of 80 weight percent vinylidene chloride, 10 weight percent vinyl chloride, and 10 weight percent butyl acrylate; with 8 parts by weight per hundred parts of copolymer of dibutyl sebacate and ½ part by weight based on the weight of the copolymer of finely divided magnesium oxide.
(J) A copolymer of 90 weight percent vinylidene chloride and 10 weight percent vinyl chloride.
(K) A blend of 90 parts by weight of (A) with 10 parts by weight of (C).
(L) 93.65 parts by weight of a copolymer of 85 weight percent vinylidene chloride and 15 weight percent vinyl chloride and mixed with 4.5 parts by weight of acetyltributyl citrate, 1 part by weight Paraplex G-60, ¾ of a part by weight tertiarybutyl salol, and 1/10 of a part by weight finely divided tetrasodium pyrophosphate.
(M) 92.5 parts by weight of a copolymer of 85 weight percent vinylidene chloride and 15 weight percent vinyl chloride; 5 parts by weight of ethylphthalylethyl glycolate, 1.5 parts by weight of tertiarybutyl salol and 1 part by weight of Paraplex G-60.
(N) As (A) but containing only 4 parts by weight of acetyltributyl citrate.
(O) Polypropylene having a melt flow of 16 as determined at 230° C.
(P) A blend of 5 weight percent (O) and 95 weight percent (D).
(Q) A blend of 95 parts by weight (A), 5 parts by weight (C).
(R) Commercially available extrusion grade polyvinyl chloride resin.
(S) A copolymer of 75 weight percent ethylene and 25 weight percent vinyl acetate, having a Melt Index of 5.1.
(T) A copolymer of 80 weight percent ethylene and 20 weight percent VAC, having a Melt Index of about 3.0.
(U) A copolymer of 76 weight percent ethylene and 24 weight percent vinyl acetate, having a Melt Index of about 1.8.
(V) A copolymer of 74 percent ethylene and 26 weight percent vinylacetate having a Melt Index of 6.
(W) A mixture of 1 part of B and 3 parts S.
(X) A mixture of 1 part of B and 1 part S.
(Y) Chlorinated polyethylene containing 35 weight percent chlorine 1.3 percent crystalline.
(Aa) A copolymer of 70 weight percent ethylene, 30 weight percent ethylacrylate having a Melt Index of about 2.5.
(Ab) A copolymer of 70 weight percent ethylene and 30 weight percent isosobutyl acrylate having a Melt Index of about 2.5.

In a manner similar to the foregoing examples, other beneficial films in accordance with the invention are prepared by the coextrusion of polyethylene as the outer layers of the film (0.55 ml in thickness) and inner layers (0.4 mil in thickness) have the following composition: a polymer of 80 weight percent vinylidene chloride and 20 weight percent vinyl chloride. When the layers have the preceding dimensional relationship in mils, the oxygen transmission of the film is 0.8 cc. per hundred square inches per atmosphere at 70° Fahrenheit. When the barrier layer of the foregoing film is composed of a copolymer of 91 weight percent vinylidene chloride, 6 weight percent acrylonitrile, 3 weight percent methyl methacrylateee plus ½ of 1 percent itaconic acid based on the combined weight of the vinylidene chloride, acrylonitrile and methyl methacrylate, the oxygen is 0.6 cc. per hundred square inches per atmosphere at 70° Fahrenheit. When the barrier layer is replaced by polyvinyl chloride, the oxygen transmission is then 20 cc. per hundred square inches per atmosphere at 70° Fahrenheit. Replacement of the barrier layer by a copolymer of 73 weight percent vinylidene chloride and 27 weight percent vinyl chloride provides a film having an oxygen transmission of 1.2 cc. per hundred square inches per atmosphere at 70° Fahrenheit. When a copolymer of 80 weight percent vinyl chloride and 20 weight percent vinylidene chloride is employed, the oxygen transmission is 8 cc. per hundred square inches per atmosphere at 70° Fahrenheit. When the barrier layer is replaced by a copolymer of 80 weight percent vinylidene chloride and 20 weight percent vinyl chloride-acrylonitrile, the oxygen transmission rate is 2 cc. per hundred square inches per atmosphere at 70° Fahrenheit. When the barrier layer is replaced by a copolymer of 80 parts by weight vinylidene chloride, 14 parts by weight acrylonitrile, 6 parts by weight methyl methacrylate plus ½ part by weight of itaconic acid, the oxygen transmission rate of the film is 1.50 cc. per hundred square inches per atmosphere at 70° Fahrenheit. When the barrier layer of the film is replaced by a copolymer of 85 parts by weight vinylidene chloride, 9 parts by weight acrylonitrile and 6 parts by weight methyl methacrylate plus ½ part by weight of itaconic acid, the oxygen transmission of the resultant film is 1.2 cc. per hundred square inches per atmosphere at 70° Fahrenheit. When the barrier layer is replaced with a copolymer of 75 weight percent vinylidene chloride, 17 weight percent acrylonitrile and 8 weight percent methyl methacrylate, the oxygen transmission rate is 1.7 cc. per hundred square inches per atmosphere at 70° Fahrenheit.

Composite film in accordance with the present invention offers significant advantages in many packaging applications. For example, film in accordance with the present invention having an oxygen transmission rate below about one cubic centimeter per 100 square inches per 24 hours at 70° Fahrenheit at one atmosphere of pressure and preferably having a transmission rate below about 1.5 or 1.0 cubic centimeter per 100 square inches per 24 hours at 70° Fahrenheit under a pressure differential of one atmosphere is eminently suited for the vacuum packaging of meat products. In applications where processed meats are process cured or wholly or partially cooked meat or meat products are being packaged by the gas packaging technique, the oxygen transmission rate of the film beneficially is maintained below about 1.0 cubic centimeters per 100 square inches per 24 hours per atmosphere at 70° Fahrenheit. By gas packaging is meant the technique of enclosing a product within a wrapper or overwrap and removing the oxygen therefrom by means of flushing with a mixture of carbon dioxide and nitrogen or other gas suited to the particular product being packaged, sealing the package in the desired atmosphere. Oftentimes, as such gas packaging techniques result in a higher pressure within the package than vacuum packaging techniques, the barrier properties of the film for the gas techniques may not need be as great as for vacuum techniques. Frequently, the gas or portions of the gas are absorbed by the product to form a tightly conforming attractive package. The barrier characteristics of the film protect the contents from loss of moisture and contact with oxygen.

Beneficially, films in accordance with the invention are employed to package fresh meat products such as ground beef into what is popularly known as a "chub" package. (A chub package is a cylindrical package resembling a sausage wherein a tube of packaging material is closed at either end of the cylinder in a manner similar to a sausage casing.)

Beneficially, films of the present invention are eminently suited for the packaging of fresh frozen meat and the vacuum packaging of fresh frozen meat. The films provide a tough abrasion-resistant package which provides the necessary barrier properties as well as the crumble or wrinkle resistance, and, because of their abrasion resistance, permit shipping of frozen meats at low temperatures under normal conditions with substantially little or no failure of the package. Both natural and processed cheese and various cheese products are very satisfactorily protected by the barrier films of the present invention, both when gas packaging, vacuum packaging, and simple overwrap procedures are employed. Other products, such as fresh ground coffee, are preserved for long periods of time by vacuum packaging or gas packaging within films in accordance with the present invention which have an oxygen transmission of less than 2 cc. per 100 square inches per atmosphere at 70° Fahrenheit. The toughness and abrasion resistance of the composite film as well as the barrier characteristics result in superior low cost packages which are highly attractive. Other desirable and advantageous applications of the film in accordance with the invention are found in areas where the film is laminated to a supporting material. For example, tobacco pouches are beneficially prepared by laminating to suitable pouch paper film in accordance with the invention. The resultant pouch is readily and easily fabricated from the composite film by heat sealing and provides an inexpensive and especially serviceable pouch which maintains the tobacco moist for relatively long periods of time. Further, such a tobacco pouch, once opened, reclosed and carried about in the pocket of a smoker, exhibits excellent wear and flex resistance while providing the required barrier properties to maintain the tobacco in a desired condition for smoking.

Beneficially, composite film in accordance with the present invention is advantageously laminated with other film and sheet products, such as coated cellophanes, to provide a packaging material particularly adapted for such materials as pharmaceuticals, cosmetics and the like. The polyolefin outer layer provides the desired characteristic of heat sealing over a wide range of temperatures and provides excellent chemical resistance. The halohydrocarbon barrier layer provides additional chemical resistance so such packaging materials are, in general, highly grease resistant, easy to fabricate, abrasion resistant and chemical resistant. A further advantageous laminate is a laminate of the film in accordance with the invention to a heat-formable substrate having relatively high rigidity, such as cellulose triacetate. Small two-part containers are readily formed by first laminating composite film of the invention to a substrate of 3 to 5 mil thick cellulose triacetate, subsequently heat forming to provide a plurality of container halves wherein the cellulose triacetate layer forms the outermost layer of the container and subsequently partially sealing the halves together, filling by techniques well known to the art and subsequently completely heat sealing the portions together to form a closed container. Such packages may be formed in a wide variety of shapes and sizes and are eminently adaptable to powders and liquids, such as soap or surface-active agents, suntan lotions, shampoo, baby oil, hair oil, cough medicine, and the like, particularly where the package must retain essential oils, perfumes and the like and exhibit grease resistance.

Bags and like containers prepared from barrier films in accordance with the present invention are eminently suited for the gas packaging of nuts such as peanuts, cashew nuts, walnuts and the like. Such nuts are generally packaged in an atmosphere of nitrogen and barrier properties of the composite films of the invention which permit the preservation of the product over long periods of time without undesired decomposition of the oils. The clarity of the film is highly desired in that the product is readily displayed. The film is grease resistant, abrasion resistant, and is readily heat sealed over a wide temperature range to provide an attractive package. Shipment of nuts packaged in film in accordance with the present invention is especially successful as storage of the packaged nuts for long periods of time after shipment indicates no loss in the barrier characteristics of the packaging material. Candy and like confections are also beneficially protected, particularly hard candy which tends to be hygroscopic or candy coated with a sugar composition that tends to be hydroscopic. The excellent abrasion resistance of the film provides a package of high reliability which may be shipped for long distances and still retain the attractive bright appearance.

EXAMPLE A

About 2000 one-pound packages of natural cheese are prepared employing a composite film having five layers securely adhered together, the layers comprising a .7 mil layer of polyethylene, a 0.1 mil adhesive layer consisting of a copolymer of about 28 weight percent vinyl acetate and 72 weight percent polyethylene, a barrier layer 0.4 mil Composition (A), a 0.1 mil layer of the vinyl acetate-ethylene copolymer and a 0.7 mil layer of polyethylene. The packages are prepared on an automatic packaging machine wherein the film is fed to the machine, blocks of cheese deposited on the film in spaced relationship to each other, the edges of the film folded upwardly and over the blocks and sealed together to form a tube. Air is displaced from the tube by carbon dioxide and the tube heat-sealed by means of a bar sealer transversely between each block of cheese. The tube is then severed to provide a plurality of generally loosely wrapped one-pound blocks of cheese. Heat-sealing temperatures are varied from about 240° Fahrenheit to about 290° Fahrenheit and the seals are found to be strong and secure. The resultant cheese packages are stored at a temperature of about 40°–45° Fahrenheit for a period of about 16 hours. The carbon dioxide in the package is apparently absorbed into the cheese and tight packages are obtained wherein the overwrap conforms to the external configuration of the cheese blocks. Cheese packages are packaged into larger shipping containers. After 24 hours, the packages are examined and evaluated with regard to the tightness of the overwrap. The overwrap is found in all packages to conform tightly to the configuration of the cheese blocks indicating no leakage or defective seals. The shipping cartons are closed, shipped by truck for a distance of 1600 miles and are maintained at a temperature of about 40° Fahrenheit. The packages on arrival at their destination are stored in a refrigerated storage area and samples of the cheese packages removed periodically over a period of six months. The cheese is in excellent condition and salable. Comparative tests with commercially available overwrap material indicate inferior protection of the product by the commercial material.

EXAMPLE B

In a manner somewhat similar to Example A, about 1000 one-half-pound packages of sliced processed cheese are packaged by means of conventional commercial packaging equipment in a composite film consisting of three layers, the outer layers being low density polyethylene having a thickness of 0.65 mil and a central layer of a copolymer of 86 weight percent vinylidene chloride and 14 weight percent vinyl chloride suitably stabilized and plasticized, the thickness of the central layer being 1.1 mil. The resultant packages are placed in conventional shipping containers and shipped by refrigerated railroad car for a distance of about 2600 miles, after which they are unloaded and placed in refrigerated storage at about 40° Fahrenheit. The packages are periodically removed over a period of about six months and are found to be salable and the contents in an edible condition without sign of mold or loss of protection. Comparative tests with commercially available packaging material indicate inferior performance of the commercial material.

EXAMPLE C

Three hundred 12-ounce packages of liver sausage are prepared utilizing a "chub" packaging machine and a packaging film in accordance with the invention comprising a five-layer film wherein the central layer (0.32 mil in thickness) is a copolymer of 85 parts by weight vinylidene chloride and 15 parts by weight vinyl chloride suitably stabilized and plasticized. The outer layers are 0.6 mil thick layers of low density polyethylene, the intermediate layers between the central and outer layers are 0.09 mil thick layers of a copolymer of 83 weight percent ethylene and 17 weight percent vinyl acetate. The generally cylindrical packages are closed by means of a hog ring or a circumferential clamp. The packages of liver sausage are subsequently placed in cartons, each containing 12 packages, and shipped by refrigerated motor freight for a distance of about 1800 miles, unloaded, and maintained in refrigerated storage for a period of about 28 days. Subsequent examination of the packages indicates all packages to be in salable condition and the contents in an edible condition.

EXAMPLE D

In a manner generally similar to Example B, eight-ounce packages of sliced hard salami are packaged employing the film employed in Example B. Shipping and storage tests indicate excellent protection is obtained.

EXAMPLE E

Employing apparatus and packaging film of Example C, fresh ground beef is packaged in one-pound and three-pound chub packages. The packages are subjected to normal merchandising conditions and found to be eminently satisfactory.

EXAMPLE F

A plurality of bags is prepared from a film in accordance with the invention comprising five layers, the outer layers consisting of 0.5 mil thick layers of low density polyethylene, the central layer consisting of 0.15 mil thick layer of the vinylidene chloride copolymer of Example A and employing intermediate layers 0.07 mil in thickness of the ethylene-vinyl acetate copolymer of Example A. The bags are of sufficient size to contain one pound of ground roasted coffee beans prior to sealing, the bags are flushed with carbon dioxide to remove air. After sealing, the bags of coffee are placed in cartons adapted to receive 50 bags each and subsequently shipped by motor freight for a distance of about 2800 miles and stored at ambient room temperature for a period of about six weeks. No spoilage of the coffee in the packages is found and the packages remain clear and transparent without exhibiting signs of abrasion by the granular coffee.

EXAMPLE G

A film is prepared in accordance with the invention comprising three layers, the outer layers each being 0.55 mil thick and the central layer consisting of a 0.1 mil thick copolymer of 93 parts vinylidene chloride and 7 parts ethyl acrylate stabilized and plasticized with 5 percent acetyl tributyl citrate, 1 percent Paraplex G–60 and 0.75 percent tertiarybutyl salol, all percentages being weight percentages based on the total weight of the vinylidene chloride copolymer. One surface of the film is coated with an aqueous dispersion of a copolymer of 60 parts by weight styrene and 40 parts by weight butadiene and the water removed. The coated film is then laminated to a sheet of 25-pound pouch paper between a pair of heated pressure rolls. The resultant paper is fabricated into a plurality of tobacco pouches by heat sealing wherein the laminated polyethylene-saran-polyethylene film is the inner surface of the pouch. About 50 of such pouches are filled with three ounces of cut pipe tobacco and rolled tightly in the conventional manner. The filled pouches are stored at ambient temperature and at a relative humidity which ranges from about 10 percent to about 40 percent for a period of five months. At the end of this period, the tobacco is in a moist and smokable condition. Several of the pouches are carried by pipe smokers for periods of up to two weeks and no significant deterioration of the tobacco quality is noted. Several of the pouches are refilled twice and subjected to use by smokers. The pouches appear in generally good condition with no evidence of failure of the barrier layer.

EXAMPLE H

Five mil cellulose triacetate is laminated to the composite film of Example C by means of a styrene-butadiene copolymer adhesive. The resultant composite film is heat formed by means of vacuum drawing to provide a plurality of symmetrical container halves, each capable of containing about one fluid ounce. Groups of ten containers are filled with a commercial detergent solution sold under the trade name of Dove, suntan lotion, baby oil, a liquid cough medicine, cold cream (of the cosmetic variety), and hair oil and subsequently sealed. The containers are stored under ambient conditions for a period of about eight months. On subsequent examination, no significant deterioration of the contents is observed.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:
1. A food package comprising
  (1) a flexible packaging film, the packaging film being scratch resistant and having low shrinkage, the film being an extruded film of coextruded materials and the film comprising
    (a) a resinous barrier layer having first and second major faces, the barrier layer comprising a copolymer of a major portion of vinylidene chloride and at least one other olefinically unsaturated monomer,
    (b) first and second synthetic resinous bonding layers disposed on and adhered to the first and second major faces of (a), respectively,
    (c) first and second resinous polyolefin layers, the resinous polyolefin being a polymer of $\alpha$-olefin having from 2–8 carbon atoms, the layers disposed on and adhered to the first and second bonding layers, respectively, the heat sealing temperature of (c) being substantially less than (a), the film having an oxygen transmission rate of not more than 10 cubic centimeters per 100 square inches per 24 hours under one atmosphere of pressure at 70° F., the layers (a), (b) and (c) being generally unoriented and the resin composition of layer (b) is chemically different from that of layers (a) and (c), and

(2) a foodstuff, the packaging film being disposed about the foodstuff.

2. The package of claim 1, wherein the foodstuff is a cheese.

3. The package of claim 1, wherein the article is a processed meat product.

References Cited

UNITED STATES PATENTS

| | | | |
|---|---|---|---|
| 2,893,908 | 7/1959 | Antlfinger | 161—242 |
| 3,086,216 | 4/1963 | Brooks et al. | 161—214 |
| 3,152,950 | 10/1964 | Palmquist et al. | 161—167 |
| 3,170,013 | 2/1965 | Ploetz | 264—171 |
| 3,219,734 | 11/1965 | Mattin | 161—165 |
| 3,223,761 | 12/1965 | Raley | 264—171 |
| 3,274,004 | 9/1966 | Curler et al. | 99—171 |
| 3,321,804 | 5/1967 | Breidt, Jr., et al. | 264—171 |

FRANK W. LUTTER, Primary Examiner

W. L. MENTLIK, Assistant Examiner

U.S. Cl. X.R.

99—171, 178